UNITED STATES PATENT OFFICE.

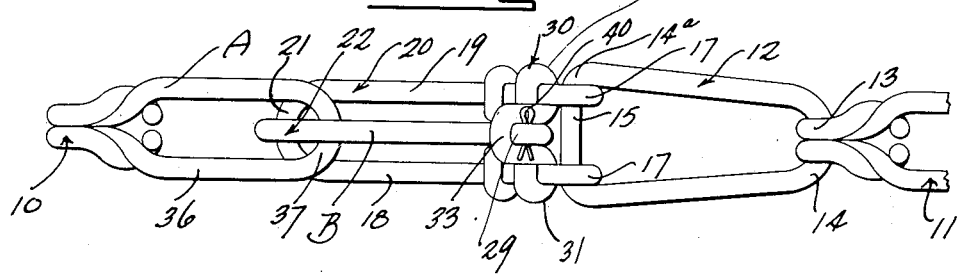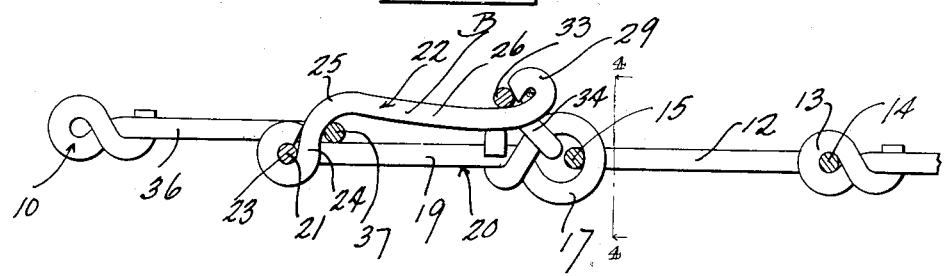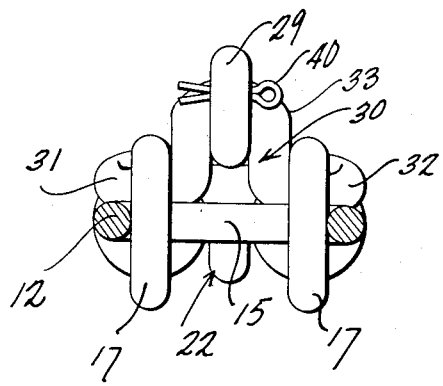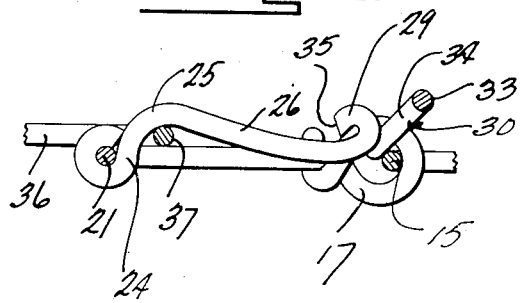

JOHN L. STONE, OF LEETON, MISSOURI.

TIRE-CHAIN FASTENER.

1,403,877. Specification of Letters Patent. Patented Jan. 17, 1922.

Application filed May 14, 1921. Serial No. 469,477.

*To all whom it may concern:*

Be it known that I, JOHN L. STONE, a citizen of the United States, residing at Leeton, in the county of Johnson and State of Missouri, have invented certain new and useful Improvements in Tire-Chain Fasteners, of which the following is a specification.

This invention relates to fasteners for detachably securing the ends of tire chains, binding elements, and the like.

The primary object of the invention is the provision of a fastener for non-skid tire chains, and embodies special latching and locking features for rendering the same safe, practical, and easy of operation, as a connecting element.

A further object of the invention is the provision of a fastening device of the above described character, which is simple in construction, economical to manufacture, and which can easily be attached to approved types of non-skid tire chains.

Other objects and advantages will be apparent during the course of the following detailed description.

In the accompanying drawings, forming a part of this specification, and in which similar reference characters designate corresponding parts throughout the several views:

Figure 1 is a plan view of the improved tire chain fastener, showing the same connecting spaced ends of a tire chain.

Figure 2 is a side elevation of the improved device illustrated in Figure 1, and showing details thereof in cross section.

Figure 3 is a side elevation partly in section of details of the improved tire chain fastener.

Figure 4 is an enlarged cross sectional view taken on the line 4—4 of Figure 2.

In the drawings, wherein for the purpose of illustration is shown a preferred embodiment of my invention, the letter A designates a chain or other device; and having the tire fastening device B connected thereto for fastening free ends of said device in connected proximate relation.

The tire chain or binding element A may be of any approved type, and as shown in the illustration the same comprises free ends 10 and 11 of an ordinary length of Weed tire chain.

A special link 12 is pivotally connected to the loop 13 of the link upon the end 11, said special link 12 being tapered in formation, and preferably of integral forged construction. The same is pivotally connected at its smaller end 14 to the loop 13, thus having its larger end $14^a$ projecting forwardly. The larger end $14^a$ of the special link 12 is provided with the substantially straight bar 15, which pivotally receives the relatively large loops 17, bent upon the ends of the side portions 18 and 19 of the substantially U-shaped support 20. The U-shaped support 20 is preferably of steel wire and of equal quality with the chain A. The legs 18 and 19 are spaced, and connected by an arcuate bight portion 21.

A substantially J-shaped connecting lever 22 is pivotally connected through an eye or aperture 23 upon the free end of a short arm 24, to the bight portion 21 of the U-shaped lever support 20. The arm 26 is preferably arcuate, and substantially at right angles, and connected to the shorter arm 24 by a curved bight portion 25, said arm 26 extending forwardly to project centrally between the loops 17 on arms 18 and 19 of the support 20. The extreme end of the arm 26 is provided with a looped eye or apertured head 29, for a purpose to be subsequently set forth.

In order to maintain the lever 22 closed upon the support 20, an arched latch 30 has been provided, the same comprising the looped ends 31 and 32 for pivotal connection upon the loops 17 of arms 18 and 19 of the support 20. The loops 31 and 32 are rigidly connected with a substantially U-shaped and integral arched portion 33, said arched portion 33 being provided with a suitable recess 34 for the free insertion of the arcuate arm 26. The top of the arched portion 33 is adapted to engage the arcuate arm 26 immediately adjacent the apertured head 29 thereon, and engages a flat end 35 of the head 29 to lock the lever 22 upon the support 20 for connecting the ends 10 and 11 of a tire chain A. In some instances, where heavy use is required upon the vehicle wheel which supports the tire chain, an absolute locking device is desirable, and in such instances a cotter pin 40 is provided for detachable insertion through the aperture of the head 29; and for engagement against the outer surface of the latch 30 to prevent the same from becoming disengaged in its locked position upon the lever 22.

In operation, the improved fastener B having been properly attached to an end of the tire chain A, the link 22 is pivotally swung upon the bight portion 21 of the support 20 until the arcuate arm 26 is disposed in the end link 36 of the chain end 10. The arcuate arm 26 is then pulled forwardly until the end link rides over the arcuate connection 25 onto the arm 24; thus pulling the extreme end 37 of link 36 forwardly to overlap the position 21 of the support 20. In this position, the arcuate arm 26 lies in substantially parallel alignment with the support 20, the aperture head 29 extending centrally and forwardly between the loops 17. The latch 30 is then pivotally swung upwardly until the arch portion 33 thereof engages over the head 29, and upon manual release of the arm 26 the tensioning upon the ends 10 and 11 of the chain A will effectively force said arcuate arm 26 into the recess 34 as provided by the latch 30. The cotter pin or key 40 is then properly inserted through the aperture in head 29, thus securely and absolutely preventing disconnection of the tire chain fastener B, and maintaining the ends 10 and 11 of tire chain A in connected proximate relation.

Various changes in the shape, size and arrangement of parts may be made to the form of the invention herein shown and described, without departing from the spirit of the invention or the scope of the claims.

I claim:

1. In a tire chain fastener, the combination with a length of chain, of a cam lever for bringing the ends of said chain together, and means pivoted to one end of said chain and movable in a defined arc for locking said lever to prevent disconnection of said chain ends therefrom.

2. In a tire chain fastener, the combination with disconnected ends, of a cam lever pivotally connected to one of said ends for engaging through said other end to hold the ends in fixed connected relation, means pivotally connected to the end upon which said lever is pivoted for engaging the lever to hold the same closed, and detachable means for engaging said lever and first mentioned means for locking said lever to hold the ends connected.

3. In a tire chain fastener, the combination with chain ends, of a special link connected to one chain end, a lever, a substantially U-shaped lever support pivotally clamped to said special link, and pivotally receiving said lever whereby the same may be operated to receive the other chain end, and means for clamping said lever in closed position to hold the chain ends in connected proximate relation.

4. A fastening device, comprising in combination a support, a connecting lever pivotally connected thereto, a latch pivotally connected to said support for engaging and maintaining said lever in closed position upon the support, and a detachable key for locking said latch from disconnection with the closed lever.

5. A fastening device, comprising in combination a substantially U-shaped support, a fastening lever pivotally connected on the bight portion of said support, a link pivotally connected to the free ends of said support, and adapted for detachably maintaining the lever in closed position on the support.

6. A fastening device, comprising in combination a substantially U-shaped support, a fastening lever pivotally connected on the bight portion of said support, a link pivotally connected to the free ends of said support and adapted for detachably maintaining the lever in closed position on the support, and detachable means for locking said latch from accidental disconnection with the lever.

7. A fastening device, comprising in combination a substantially U-shaped support having loops upon the free ends thereof, a substantially J-shaped lever pivotally connected at the end of its short arm to the bight portion of said support and adapted to have its long arm extending rearwardly when in closed position to project between the loops on the free ends of said support, and an arch latch pivotally connected to the loops of said support and adapted to engage the projecting free end of said lever for maintaining the same closed upon the support.

8. A fastening device comprising in combination, a substantially U-shaped support having loops upon the free ends thereof, a substantially J-shaped lever pivotally connected at the end of its short arm to the bight portion of said support and adapted to have its long arm extending rearwardly when in closed position to project between the loops on the free ends of said support, an arch latch pivotally connected to the loops of said support and adapted to engage the projecting free end of said lever for maintaining the same closed upon the support, and a cotter pin detachably connected to the free end of said lever and engaging said latch to close the same thereon from accidental detachment from the lever.

9. In a tire chain fastener, the combination with a pair of chain ends, of a special tapered link connected at its smaller end to one of said ends, a substantially U-shaped support having loops upon its free ends loosely entwined about the larger end of said special link, a substantially J-shaped cam lever pivotally connected to the bight portion of said support, and adapted for engagement to the other chain end, an arch link pivotally connected to the loops of said support and adapted for swinging movement over an end of said lever to securely connect the same to said support to form the closure for locking said chain ends in proximate relation.

10. In a tire chain fastener, the combination with a pair of chain ends, of a special tapered link connected at its smaller end to one of said ends, a substantially U-shaped support having loops upon its free ends loosely entwined about the larger end of said special link, a substantially J-shaped cam lever pivotally connected to the bight portion of said support, and adapted for engagement to the other chain end, an arch link pivotally connected to the loops of said support and adapted for swinging movement over an end of said lever to securely connect the same to said support to form a closure for locking said chain ends in proximate relation, and a cotter pin detachably inserted through the end of said lever adjacent said latch, and adapted for engaging said latch to lock the same on said lever to prevent pivotal movement of the latter.

JOHN L. STONE.